(12) United States Patent
Howard

(10) Patent No.: US 7,319,383 B2
(45) Date of Patent: Jan. 15, 2008

(54) DISTRIBUTED MOTION PREDICTION NETWORK

(75) Inventor: Mike Howard, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 827 days.

(21) Appl. No.: 10/369,218

(22) Filed: Feb. 15, 2003

(65) Prior Publication Data

US 2004/0061605 A1 Apr. 1, 2004

Related U.S. Application Data

(60) Provisional application No. 60/357,777, filed on Feb. 15, 2002.

(51) Int. Cl.
*G08B 1/00* (2006.01)
(52) U.S. Cl. ............... 340/531; 340/686.1; 340/541; 340/539.11; 340/539.13; 342/357.08; 455/404.2
(58) Field of Classification Search ............ 340/531
See application file for complete search history.

(56) References Cited

U.S. PATENT DOCUMENTS

| | | | | |
|---|---|---|---|---|
| 3,996,590 | A * | 12/1976 | Hammack | .......... 342/465 |
| 5,099,402 | A | 3/1992 | Starniri | |
| 5,130,543 | A * | 7/1992 | Bradbeer | .......... 250/342 |
| 5,323,470 | A * | 6/1994 | Kara et al. | .......... 348/169 |
| 5,442,532 | A | 8/1995 | Boulos et al. | |
| 5,696,503 | A * | 12/1997 | Nasburg | .......... 340/933 |
| 5,921,661 | A | 7/1999 | Eusterbrock et al. | |
| 6,078,269 | A | 6/2000 | Markwell et al. | |
| 6,088,467 | A | 7/2000 | Sarpeshkar et al. | |
| 6,512,537 | B1 * | 1/2003 | Shimizu et al. | .......... 348/155 |
| 6,885,303 | B2 * | 4/2005 | Payton et al. | .......... 340/825.49 |
| 6,941,239 | B2 * | 9/2005 | Unuma et al. | .......... 340/825.49 |
| 2004/0010492 | A1 | 1/2004 | Zhao et al. | |

FOREIGN PATENT DOCUMENTS

WO      WO 00 74306 A      12/2000

OTHER PUBLICATIONS

Lee, J-H, et al., "Intelligent Space, its past and future," Industrial Electronic Soc., IECON'99 Proceedings, 25th Annual Conf. of the IEEE, San Jose, Ca USA Nov. 29-Dec. 3, 1999, Piscataway, NJ, USA, pp. 126-131.

* cited by examiner

*Primary Examiner*—Daniel Wu
*Assistant Examiner*—Eric M. Blount
(74) *Attorney, Agent, or Firm*—Tope-McKay & Associates

(57) ABSTRACT

The present invention provides a distributed motion prediction network including a plurality of nodes. The nodes in the network comprise a mechanism for detecting the presence of an object in an area around a node. A node that detects an object is termed a "detecting node." After a node has detected an object, it communicates a signal to local nodes that are local with the detecting node to inform the local nodes of the presence of the object in the area around the detecting node. After the local nodes receive the signal, they further propagate the signal to other nodes (local to the local nodes) so that information regarding the presence of the object is progressively propagated to nodes away from the detecting node and so that as the object moves, the propagated signal is used to predict a direction of travel of the object.

100 Claims, 10 Drawing Sheets

| Times | Nodes | | | | | | | | | | |
|---|---|---|---|---|---|---|---|---|---|---|---|
| | | A | B | C | D | E | F | G | H | I | J |
| | t1 | 10 | 9 | 8 | 7 | 6 | 5 | 4 | 3 | 2 | 1 |
| | t2 | 9 | 10 | 9 | 8 | 7 | 6 | 5 | 4 | 3 | 2 |
| | t3 | 8 | 9 | 10 | 9 | 8 | 7 | 6 | 5 | 4 | 3 |
| | t4 | 7 | 8 | 9 | 10 | 9 | 8 | 7 | 6 | 5 | 4 |
| | t5 | 6 | 7 | 8 | 9 | 10 | 9 | 8 | 7 | 6 | 5 |

FIG. 5

$\overline{C} \cdot \overline{D} + B \cdot \overline{C} + A \cdot C \cdot \overline{D} + B \cdot C \cdot \overline{D} = Y$

| Current Activation Mechanism State | Current Sensor State | Signal = Memory | Signal – Memory (Sign Bit) | Next Activation Mechanism State |
|---|---|---|---|---|
| A | B | C | D | Y |
| 0 | 0 | 0 | 0 | 1 |
| 0 | 0 | 1 | 0 | 0 |
| 0 | 0 | 0 | 1 | 0 |
| 0 | 1 | 1 | 0 | 1 |
| 0 | 1 | 0 | 0 | 1 |
| 0 | 0 | 0 | 1 | 1 |
| 1 | 0 | 1 | 0 | 1 |
| 1 | 0 | 0 | 1 | 1 |
| 1 | 1 | 1 | 0 | 0 |
| 1 | 1 | 1 | 0 | 1 |
| 1 | 1 | 0 | 1 | 1 |

FIG. 8

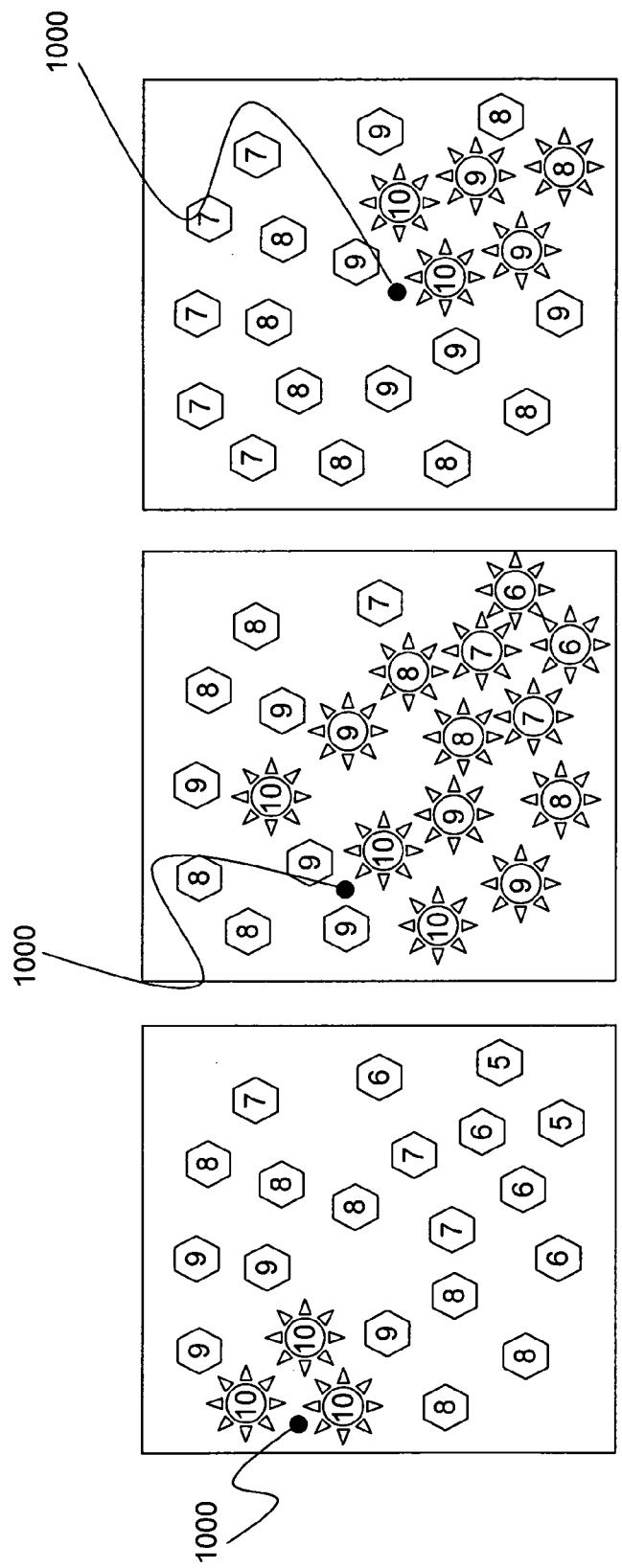

DISTRIBUTED MOTION PREDICTION NETWORK

PRIORITY CLAIM

This application claims the benefit of priority to provisional application No. 60/357,777, filed in the United States on Feb. 15, 2002, and titled "Amorphous Motion Sensing".

BACKGROUND OF THE INVENTION (1) Technical Field

The present invention relates to techniques for communications within distributed networks of sensor nodes. More specifically, the present invention relates to a technique for predicting the movement of an object through a network of sensor nodes.

(2) Discussion

Over the past several decades, the electronic communications field, particularly in the area of wireless communication, has exploded. As such, the abilities of small processing devices have increased considerably while the cost of these devices has decreased. Wireless communication generally takes place between specific devices or nodes. In order to perform tasks such as developing routes through a network, it is generally necessary to provide each member of a network with a unique identity so that specific devices can communicate. For example, in a cellular network or even in an ad-hoc network, a unique identity or address is assigned to each device so that it may exclusively receive calls targeted to its address. In addition, communications in most networks also require a "handshake" or mutual acknowledgement that a call or communication is to be set up. These networks depend on physical reliability in order function properly. Various communication properties are used in monitoring the performance of individual links in the network in order to adjust parameters of the communication system to maximize its effectiveness.

With the increased computational abilities and reduced cost of small, relatively simple devices comes the need for additional communication schemes that do not rely on the need for specific address assignments and complex communication acknowledgement schemes. It is desirable that these communication schemes take advantage of the processing capability of modern devices while conserving power by using local communications. More particularly, there exists a need in the art for a set of nodes (connected in either a wired or wireless fashion) that take advantage these local communication schemes in order to form a motion detection and prediction array.

SUMMARY OF THE INVENTION

In one aspect, present invention provides a distributed motion prediction network including a plurality of nodes. The nodes in the network comprise means for detecting the presence of an object in an area around a node. For clarity of description, a node that detects an object is termed a "detecting node." After a node has detected an object, it communicates a signal to local nodes that are local with the detecting node to inform the local nodes of the presence of the object in the area around the detecting node. After the local nodes receive the signal, they further propagate the signal to other nodes (local to the local nodes) so that information regarding the presence of the object is progressively propagated to nodes away from the detecting node and so that as the object moves, the propagated signal is used to predict a direction of travel of the object.

In another aspect, the signal includes a hop count that is incremented by each node as it is propagated between successive nodes away from the detecting node, the hop count being indicative of a hop count distance from the detecting node and a current node.

In a further aspect, as the object moves along the direction of travel, it is detected by different detecting nodes along the direction of travel, and signals originating from different detecting nodes are compared at each current node to determine whether the current node is in front of or behind the object.

In a still further aspect, the nodes selectively perform an action based on the hop count distance between a current node and a detecting node and the direction of travel of the object.

In yet another aspect, the nodes further comprise a means for detecting an object class for an object within the network. The action performed by the nodes based on the hop count distance can be tailored based on the object class of an object detected.

A wide range of actions may be performed by a node. A few examples include a visually detectable action, an auditory action, and a scent-based action.

Nodes in the network may be either mobile or in a fixed position, depending on the needs of a particular application. At least a portion of the nodes may be hard-wired together.

The nodes operate according to a logical formula. One such expression is $\overline{C} \cdot D + B \cdot \overline{C} + A \cdot C \cdot \overline{D} + B \cdot C \cdot \overline{D} = Y$, where A represents a current action state, B represents a current sensor state, C represents the result of a determination of whether the signal is equal to a memory state, D represents a signal-memory sign bit, and Y represents a next action state.

BRIEF DESCRIPTION OF THE DRAWINGS

The objects, features and advantages of the present invention will be apparent from the following detailed descriptions of the preferred aspect of the invention in conjunction with reference to the following drawings.

FIG. 5 is a table illustratively depicting an object's movement across a one-dimensional set of nodes, illustrating the hop count of the signal at each node across the set;

FIG. 8 is a truth table depicting the states of the circuit diagram shown in FIG. 7;

FIG. 10($a$)–($c$) is an illustrative diagram depicting the response a plurality of nodes in a two dimensional array as an object moves from left to right in three different timesteps.

DETAILED DESCRIPTION OF PREFERRED ASPECTS

Figure 1:
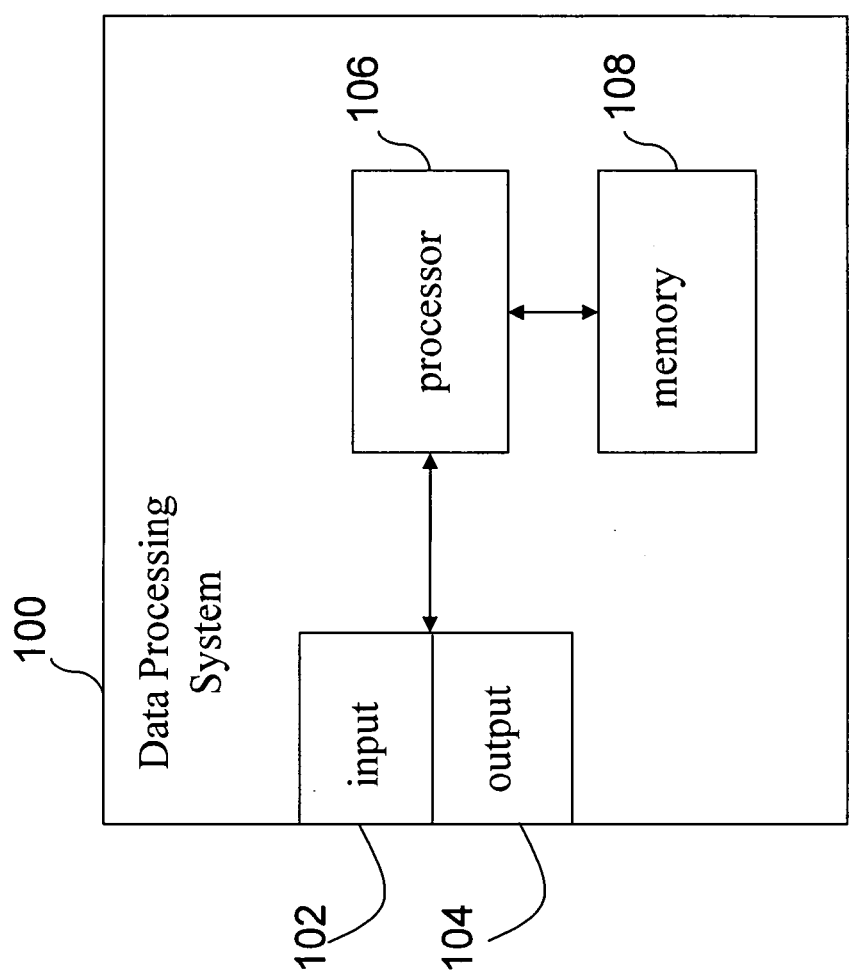
FIG. 1 is a block diagram of a data processing system used in conjunction with the present invention.

The present invention relates to techniques for communications within distributed networks of sensor nodes. More specifically, the present invention relates to a technique for predicting the movement of an object through a network of sensor nodes. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical aspects of the present invention is provided. Finally, a discussion is provided to give an understanding of the specific details.

(1) Glossary

Before describing the specific details of the present invention, a centralized location is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more accurately explaining the terms used.

Action Mechanism—An action mechanism is a general term for a device that the node operates in response to an object's motion. For example, in the case of the use of nodes in a lighting system, nodes may each be furnished with a light that is activated as an object approaches to within a predetermined distance from the node. It will be appreciated by one of skill in the art that a wide variety of action mechanisms may be provided, non-limiting examples of which include those for performing a visually detectable action such as the lights just mentioned, for performing an auditory action such as turning on an alarm to alert those in the direction of an someone approaching, and performing a scent-based action such as releasing an air freshener into the air in front of someone approaching thereby creating a more pleasant environment.

Distance Measure—The term distance measure generally indicates the distance from a node that detects an object to a current node. The distance measure may be determined exactly by using an accumulation of signal degradation as the signal is "hopped" from node to node. A simpler distance measure would be a simple hop count, e.g. the number of links between nodes a signal traverses along a path from a detecting node and a current node.

Local—The term local as used herein is intended to be indicative of a close range, the exact distance of which varies with the needs of a particular application. Most often, local indicates that communication between nodes is limited to nearby nodes such as those immediately neighboring a node. Depending on the level of node congestion, the physical range at which nodes are considered to be local with respect to one another may be varied by altering transmission power or receiving sensitivity. This can, for example, prevent a node from losing contact with the other nodes by extending the communication range of that node. On the other hand, it can also prevent packet collisions from excessively disrupting communications by reducing the communication ranges of a group of nodes.

Means—The term "means" as used with respect to this invention may vary with context. In some cases, it indicates a set of operations to be performed on a computer, and may represent pieces of a whole program or individual, separable, software modules. Non-limiting examples of "means" include computer program code (source or object code) and "hard-coded" electronics (i.e., computer operations coded into a computer chip). The "means" may be stored in the memory of a computer or on a computer readable medium. In other cases, the "means" may indicate a physical mechanism/machine for performing a useful function.

Node—As utilized herein, the term node indicates a unit comprising, in its most general sense, a sensor for detecting the presence of an object in an area about the node and a signal receiver/transmitter used to receive and propagate a signal for determining the distance between the node and another node that detected an object (or to originate such a signal if the node is the detecting node). Generally a node includes a processor for operating software for facilitating the functions discussed herein. For example, software may provide a means for determining the difference in distance measurements from different detecting nodes as an object moves through a network of nodes, and based on the difference, the node can determine whether it is in front of the object as it is moving. A memory is also included in the node for storing distance information from a received signal. Assuming that the node operates on digital data, an analog to digital converter can be provided to generate a digital representation of the strength of incoming signals. Nodes may also include many other features such as additional sensors for detecting properties of the environment and additional communication mechanisms as well as mechanisms to provide mobility. The nodes also generally include an action mechanism, as defined above.

Signal Transmitter/Receiver—A signal transmitter/receiver for use with the present invention is desirably, but not necessarily, with a communication medium exhibiting qualities including an intensity that decreases with increased distance from the sender such that it may be used effectively for distance estimation. Examples of mediums satisfying these criteria include optical (such as infrared), acoustic, and radio frequency signals.

(2) Physical Aspects

The present invention has three principal "physical" aspects. The first is a node or a system of nodes. Each of the nodes includes a sensor for detecting the presence of an object, and is typically in the form of a computer system operating software or in the form of a "hard-coded" instruction set. This system may be incorporated into a wide variety of devices that provide different functionalities. The second physical aspect is a method, typically in the form of software, operated using a data processing system (computer). The third principal physical aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

A block diagram depicting the components of a computer system used in a node of the present invention is provided in FIG. 1. The data processing system 100 comprises an input 102 for receiving information from at least one sensor for use in detecting, and possibly classifying, objects in an area around the node. Note that the input 102 may include multiple "ports." Typically, input is received from at least one sensor, non-limiting examples of which include infrared/electromagnetic radiation sensors, acoustic sensors, and others. An output 104 is connected with the processor for providing information regarding the presence and/or identity of object(s) to other systems in order that a network of computer systems may serve as a motion prediction system. Output may also be provided to other devices or other programs, e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor.

Figure 2:
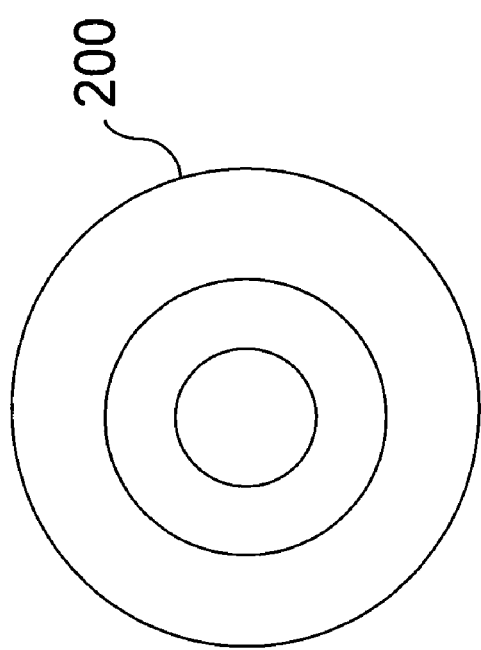
FIG. 2 is an illustrative diagram of a computer program product aspect of the present invention.

An illustrative diagram of a computer program product embodying the present invention is depicted in FIG. 2. The computer program product 200 is depicted as an optical disk such as a CD or DVD. However, as mentioned previously, the computer program product generally represents computer readable code stored on any compatible computer readable medium.

Figure 3:
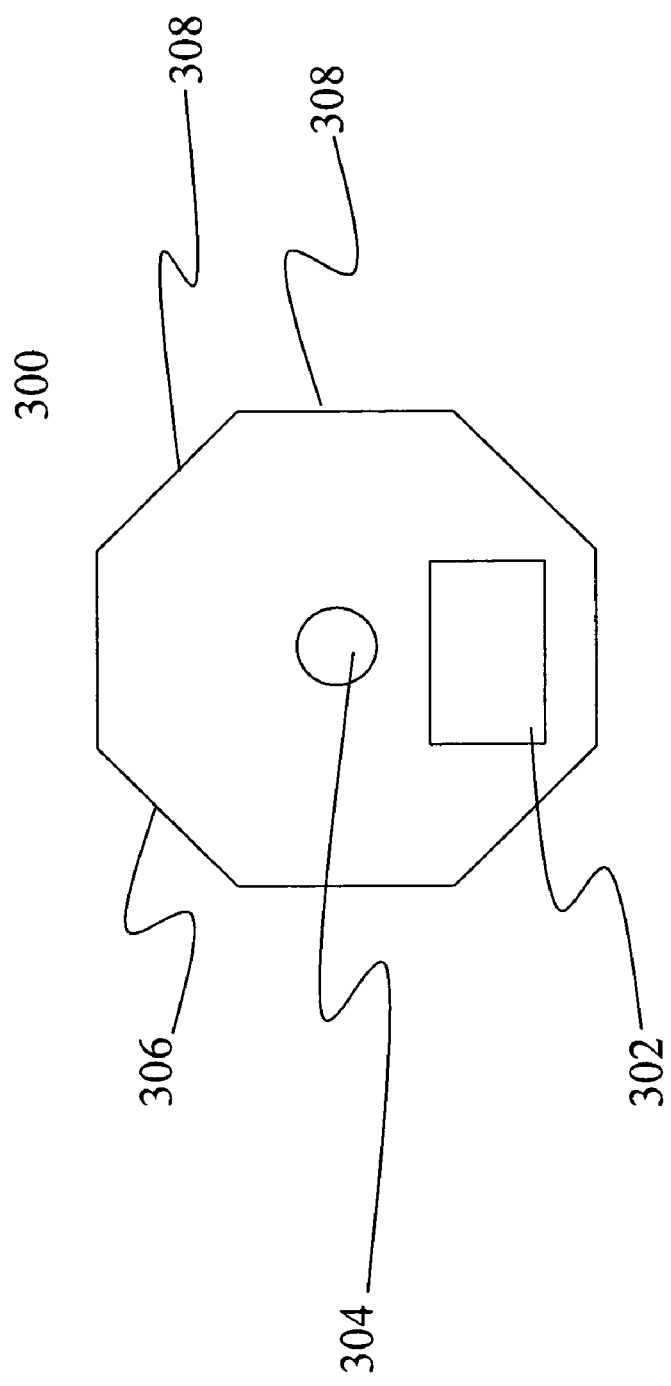
FIG. 3 is an illustrative diagram of a node aspect of the present invention.

An example of a simple node depicted in FIG. 3. As shown, the node 300 includes a data processing system 302 and a signal transmitter/receiver 304. The signal transmitter/receiver 304 is depicted in the figure as an omni directional transmitter/receiver, but may be configured directionally if desired. A sensor 306 is depicted as an infrared sensor having a plurality of angular regions 308 for detecting an object in an area about the node 300.

(3) Introduction

The present invention provides a distributed network of locally connected sensor nodes that communicate in a manner that provides a mechanism for predicting the motion of an object moving through the network. Depending on the needs of a particular aspect, the nodes may be distributed as a one-dimensional string, a two-dimensional plane, or a three-dimensional volume, and the nodes may be either set in a fixed network or they may be distributed in an ad-hoc manner and may be mobile. In operation, each node computes a function (typically binary) based on the sensor state, messages from neighboring nodes, and the current value of the function. The sensors detect a local transient property of the environment (e.g., the presence of a warm body) and return a value that indicates its presence or absence. A local-neighborhood signaling mechanism then propagates a signal that allows the local nodes to anticipate when something is moving toward them. In other words, the present invention provides a simple and distributed sensing system that predictively reacts to motion.

Briefly, when a sensor detects an object within the range of its sensor, it sends a signal to each nearest neighbor node. Those nodes propagate the message to their neighbors, with a decay factor (e.g., at a lower intensity—note however, if intensity drop-off is used, it is possible to avoid the need to relay). Looping in the network is avoided to ensure proper detection of motion directionality. When the body moves, nodes can deduce the direction of movement of the object based on changes in the signal from other nodes.

One non-limiting, illustrative application of the present invention is an active lighting system, in which each node's sensor (e.g., an infrared sensor) detects the presence or absence of a person. The function computed by the node is used to turn on a light that is packaged with the node, lighting the person's local area. The light and sensor are both embedded in and placed normal with respect to the planar surface in which the network is embedded, facing an area in which people move around. Whenever the sensor detects a warm body in front of it, it activates the light in that node. If the body moves away, the light turns off. With the addition of a predictive motion technique, the lights can be turned on ahead of the body. This particular application could be extended, for example, to turn on street lights ahead of a car, and to turn them off after the car had passed, thereby saving energy. Other similar applications are the invention's use to create an entertaining light display for a theme park, making a wall of closely-spaced lights that turn on ahead of visitors.

The cooperative prediction feature sets this invention apart from a simple array of sensor nodes. This invention connects the nodes into a distributed computing network in which a node communicates with other nodes to let it know in advance when to turn on one or more local functions such as a light. Yet the communication is simple, consisting of a measure of distance (e.g., an intensity that decreases from an origin), or hop count, and an optional object type signal. If a sensed object stops moving, only the node or nodes in the local area keep the local function on. In the case of a lighting array, this would provide task lighting for a person working or shopping in a large area, and the light would move ahead (to a predetermined distance) of the person if they started to move. This can provide cost savings in certain cases, because the lighting is automatic and rather than an average diffuse light, the system can offer a more intense dynamic area light for the same wattage. Current systems are able to turn on lights in response to sensing people, for example, by touch, but they have no predictive capability.

In another example application, a predictive grid formed using the techniques presented herein could be applied in a human-operated command and control setting, tracking the movements of commanders and using the predictions to alter displays and consoles, as well as lighting. In this setting, individual commanders would wear unique visual, audio, electronic, or other markings that the sensors in the grid could use to positively identify them, making the tracking more foolproof. The network could be embedded, for example, in ceiling or floor tiles. Sensor networks such as this are of great military interest, especially very low power networks that could, for example, be scattered by air. This invention could be used in a wireless distributed sensor network such as this, in situations where each node communicates to its nearest neighbors. The predictive feature could be used to "wake up" sensors ahead of the movement of the sensed object, perhaps turning on more expensive sensing functions that are normally dormant to save power.

Other non-limiting uses of the present invention include the marketing of cars and other products. Marketing displays could be improved and interest generated by using the sensing network's predictive reaction to a customer's movements to turn lights off and on in a pattern that precedes the customer. A large area such as a car lot could be lit with a uniform low light, but as a customer walked around, brighter lights hung in a grid would blink on ahead of the customer, highlighting the customer's path in a 180 degree radius. The predictive lighting would spotlight cars the customer is moving toward, and turn off the spotlights as the customer moves away.

Additionally, the current method of lighting rooms and corridors is to use one or more large lights with diffuse luminance. This invention could be applied in "smart homes" in conjunction with a grid of small spotlights. When the lighting network is installed in a ceiling, it can provide area lighting which precedes people as they move around. The same type of function could also be applied to activate home entertainment center components, open doors, or to provide heating ahead of a user. If it is installed in a hallway, lights would seem to move with the person down the hall. A fine-resolution active lighting collective could be installed in a wall, using low-powered lights or LEDs, so that people moving in front of the wall would cause lights to turn on in a pattern that moves with the person. This sort of functionality could also be applied entertainment in a nightclub or at a theme park, for example.

In industrial settings, large warehouses are typically lit by tremendous diffuse lighting systems that are on all of the time. An active lighting collective would turn on lights when and where they are needed as people move around the area, and turn off all unneeded lights, saving electricity. Similarly, a stairway could be lit ahead of the person walking up or down the stairs. Current systems provide a way to light the entire stairway when someone touches a banister, but not a way to make the light precede the person. If the active lighting collective were installed in a floor, floor tiles could light in response to people walking on them, and the path would be lit before them as the collective predicts where they will move next. Or, lights could be placed beside a walkway to light up the path in front of people.

(4) Discussion

This section expands on the Introduction above, providing greater detail regarding the operations of the present invention. In this example, although any type of sensor could be used for object detection, for illustrative purposes, an example of infrared sensors for detecting warm bodies is used. Upon detection of an object, the node signals its immediate local neighborhood of nodes at a certain intensity level. When the neighbors receive the signal, each of them, in turn, signals its immediate neighbors. Examples of signaling mechanisms that could be used with the present invention are presented in co-pending U.S. patent application Ser. No. 09/921,295, titled "Method and Apparatus for Signaling Among a Plurality of Agents," by Payton et al., incorporated herein by reference in its entirety. Briefly, this messaging system ensures that there are no loops in signaling. It uses messages with a distance measure indicative of the distance of the current node from the object detected. A non-limiting, simple, example of a distance measure that could be used with the present invention is a hop count field that is decremented each time a node sends the message to another node. The node that detects the object initially transmits a message including a hop count set to the maximum number of hops the message is to take before it times out and sends the message to each of its nearest neighbors. Each neighbor sends the message to all of its neighbors after decrementing the hop count by a factor (e.g., hopcount=hopcount−1). Nodes that receive more than one message in a given time period choose the single message with the highest hop count to forward.

Figure 4:
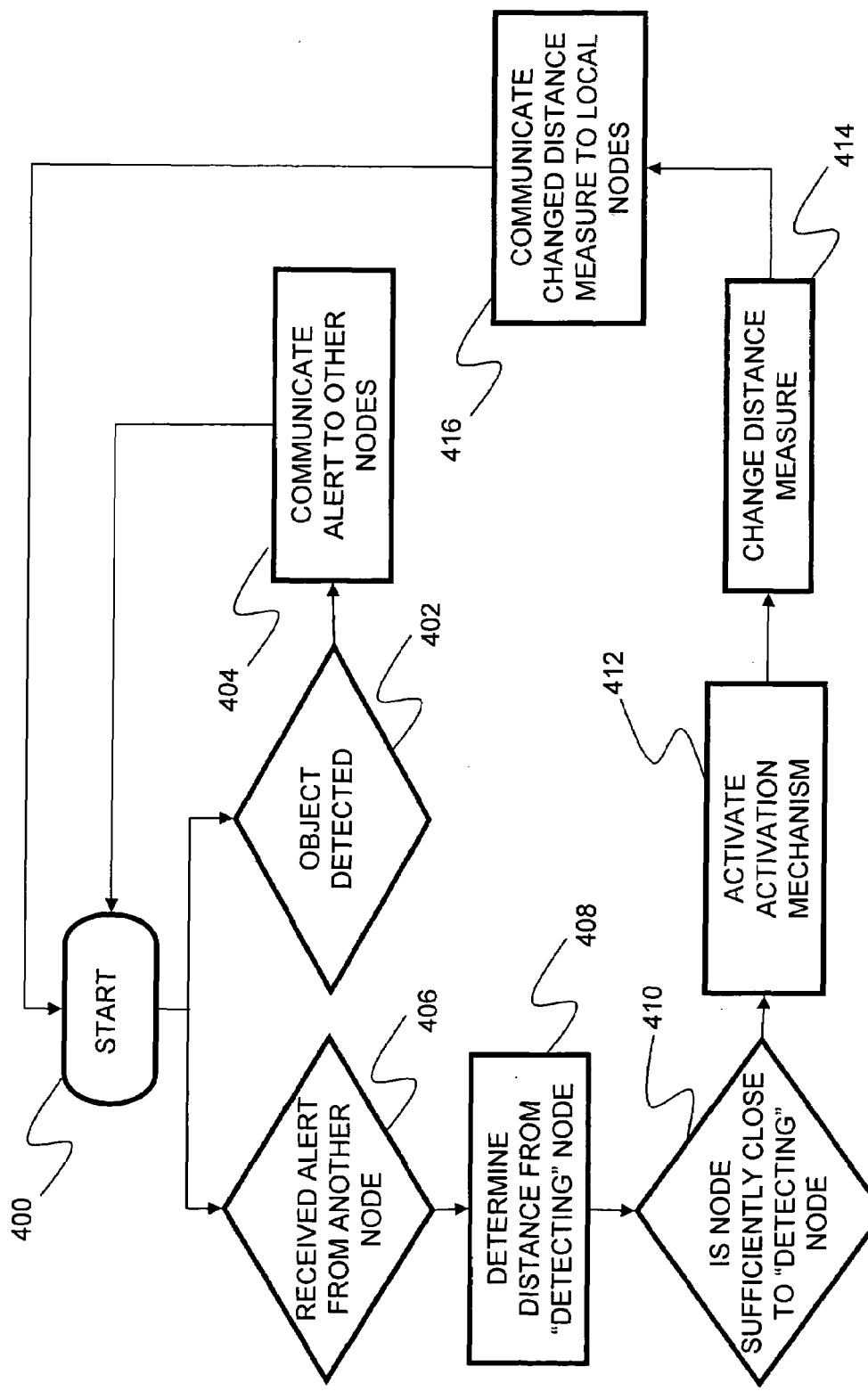
FIG. 4 is a block diagram illustrating the steps performed by a node of the present invention.

A flow chart is depicted in FIG. 4, showing the general steps performed by each node in the network of the present invention. After starting 400, a detecting step is continually performed 402, in which the node attempts to detect the presence of an object in an area around the node. If the node detects the presence of an object, it is termed a "detecting node." The node then performs a step of transmitting (communicating) a signal to other (local) nodes alerting them of the presence of the object 404. In parallel, the node awaits signals from other nodes regarding the presence of an object 406. If the node receives a signal from another node, the node checks the signal to determine the "current" node's distance from the detecting node 408. If the current node is sufficiently close to the detecting node 410, as determined by a threshold value, the node activates its activation mechanism 412 and changes a distance measure related to the message it received 414. The change in the distance measure depends on the particular manifestation of the invention, and can, for example, be based on a cumulative "count" of signal power drop along all signal hops from the detecting node to the current node, or it could be an incrementing/decrementing of a hop count that simply tracks the number of hops the signal made prior to its arrival at the current node. The node then communicates the changed distance measure to its local neighbor nodes 416. This process is performed at all nodes in the network, and it serves to propagate an alert regarding the detection of an object by one node through at least a portion of the network. The communicated signal can be tailored so that it is no longer re-transmitted after it has covered a sufficient distance, or the activation of the activation mechanism of a node can be tailored so that it is only operated when the distance is below a predetermined threshold. Successive comparisons of the distance of the object from a current node can be used to determine whether the node is in front of the object or behind it. This provides for a rough determination of the direction of the object's travel. The activation measure can be tailored to selectively activate only when the current node is in front of (or potentially behind) the object. In some situations, it may also be desirable to have different activation mechanisms operate when the node is in front of the object and when the node is behind the object, for example, opening doors as a person approaches and closing them when the person passes through them.

This scenario will now be described illustratively with respect to the table presented in FIG. 5. The entries in the rows of the table, labeled as t1 through t5 to indicate time steps, indicate the value of a distance measure in a signal, in this case a hop count initialized with a value of 10, received at a current node as the signal is propagated through a network of nodes. The nodes are labeled A through J in the network, and for simplicity of illustration, the nodes are assumed to be lined up as a one-dimensional string. At time t1, an object is detected by node A. The distance measure is transmitted with a value of 10, which in this case can be viewed as the "immediacy" of the object with respect to a given node. As the signal is propagated across the network, the "immediacy" of the object decreases relative to a given node. Thus, at node B, the distance measure is decreased to 9, and so on until it reaches a value of 1 at node J. At time step t2, the object has moved to the right, and the node directly sensing the object is now node B. Thus, node B transmits a signal with a distance measure of 10, which is propagated both forward from node C and backward from node B with a distance measure of 9, and so on. Thus, the progression of the object across the network from the location of node A to the location of node E during time steps t1 to t5. By comparing the current value of the signal to the value received in the last time step, the motion of the object can be predicted. For example, as the object moves from node B to node C between time step t2 and t3, the current value minus the last value at node A is 8−9=−1, while at node D it is 9−8=+1. Thus, in this scenario, the sign of the difference can be used to determine whether a node is in front of or behind the object. Also, in this scenario the initial "immediacy" value used for the distance measure can be used to limit the distance to which information regarding the presence of the object is transmitted. Of course, many other distance-limiting scenarios may be employed as will be readily appreciable by one of skill in the art.

Figure 6:
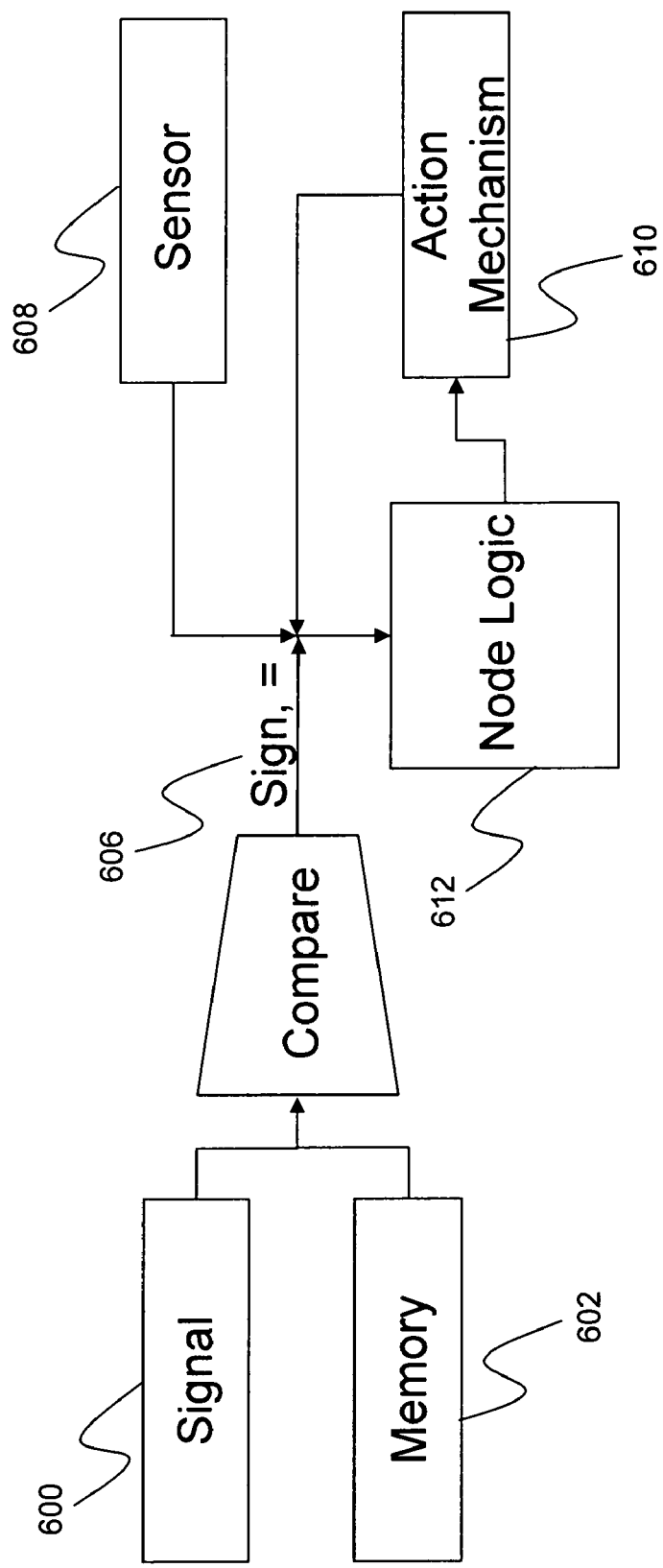
FIG. 6 is a block diagram depicting one example set of processing components of a node of the present invention.
Figure 7:
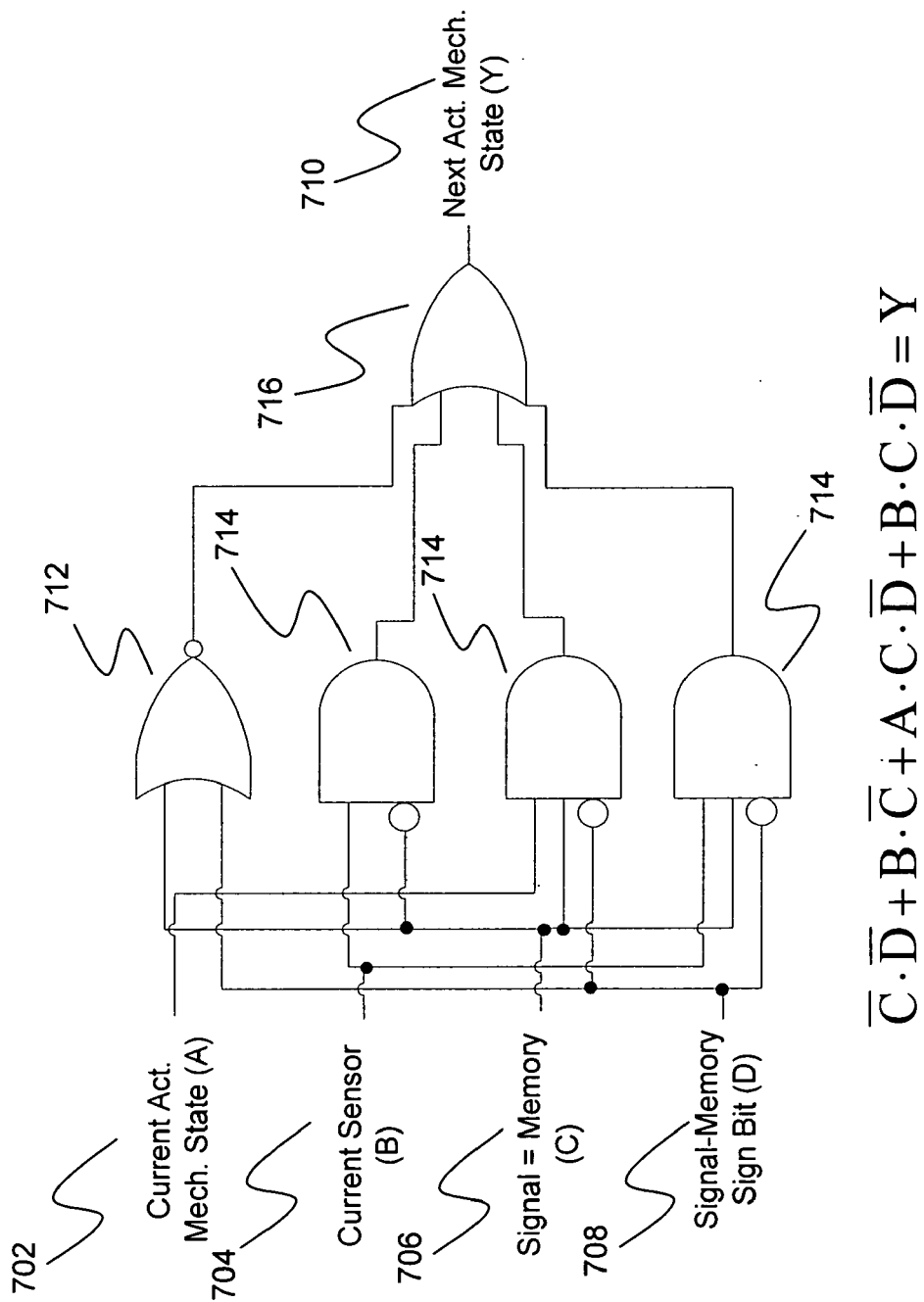
FIG. 7 is a circuit diagram depicting one example of a set of logic gates that can be used as a component of the block diagram illustrated in FIG. 6.

To implement the above scenario, the circuit shown in FIG. 6, along with the node logic shown in FIG. 7 may be used. A truth table for the node logic of FIG. 7 is shown in the table presented in FIG. 8. Using the example just discussed, in the circuit of FIG. 6, a signal 600 is received at a node from another node, for example at node D from as an object moves between node B and node C. The signal 600, which has the current value of 9, is compared with the value of the last signal received, in this case 8, which is stored in memory 602 using a comparator 604. In this case, the comparison yields a sign 606 of +, which indicates that the node is in front of the object moving through the network. The value and the sign resulting from the comparison, along with the current state of a sensor 608 and an action mechanism 610, are used in conjunction with the node rules embedded in the node logic 612 to determine the next state of the action mechanism 610.

An example of node logic 612 that provides the desired functionality is shown in FIG. 7. The corresponding states are shown in the truth table of FIG. 8. The logic circuit 700 comprises inputs for a current activation mechanism state (A) 702, a current sensor state (B) 704, a signal minus memory (signal-memory) state (C) 706, and a signal minus memory (signal-memory) sign bit state (D) 708. The output of the logic circuit 700 indicates the next light state (Y) 710. In the version shown, the logic circuit 700 includes a NOR gate 712, three AND gates 714, all of which serve as inputs to an OR gate 716. It should be apparent to one of skill in the art that many equivalent circuit configurations are available that implement the logic expression $\overline{C}\cdot\overline{D}+B\cdot\overline{C}+A\cdot C\cdot\overline{D}+B\cdot C\cdot\overline{D}=Y$. The truth table shown in FIG. 8 provides entries that result from this logic function. For all states, a 1 indicates the presence of the state or "on" and a 0 indicates the lack of the state or "off."

Figure 9:
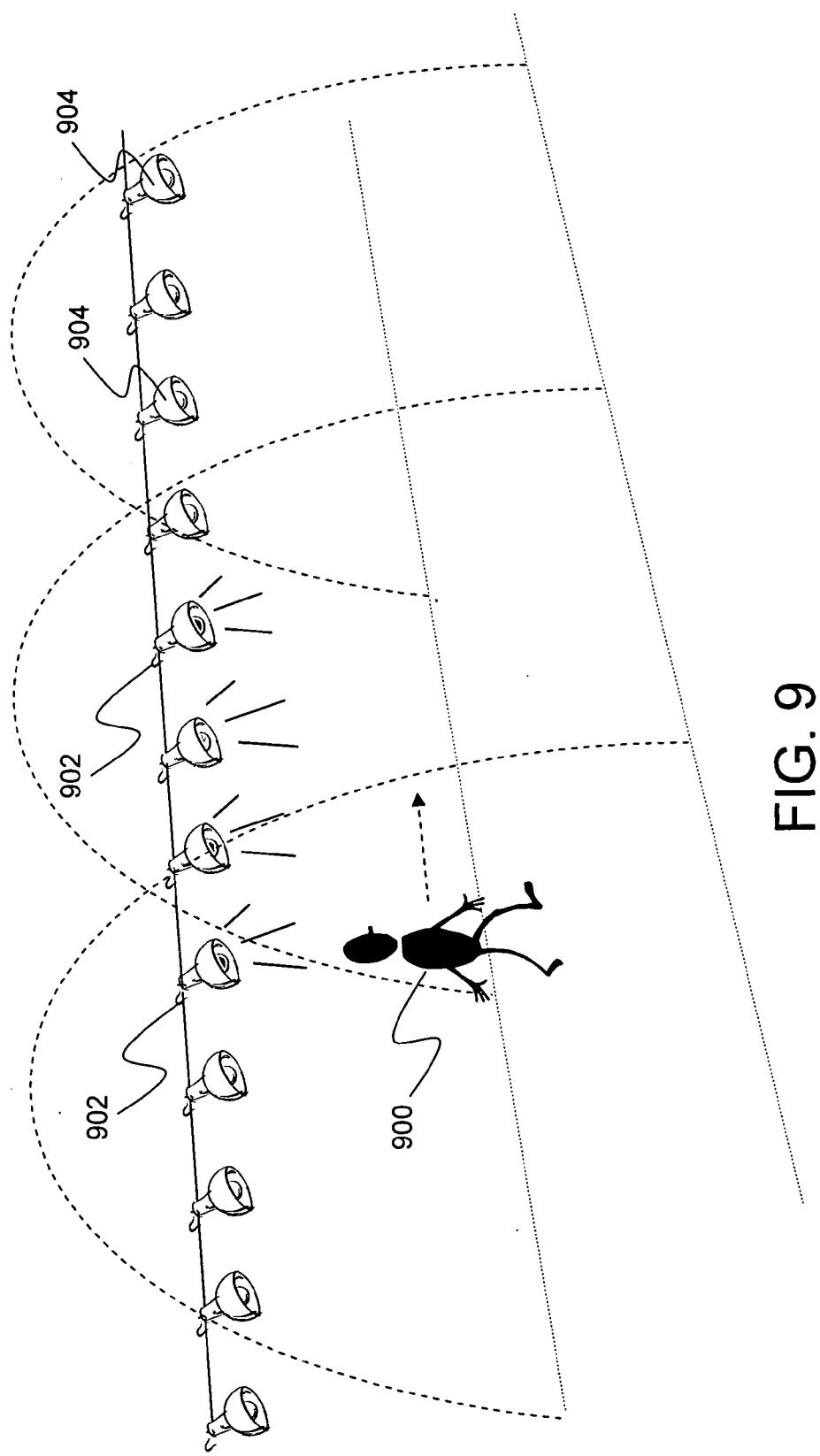
FIG. 9 is an illustrative diagram of a one-dimensional set of nodes functioning as on/off switches to control a lighting system as an object passes.

This system may be implemented, for example as a lighting system in a mineshaft. Such a system is depicted illustratively in FIG. 9. As a user 900 walks in a direction, infrared sensors 902 connected with lights 904 (only a few of each are labeled in the figure to avoid crowding) detect the presence of the user, each activating their respective light as the user progresses, according to the logic provided in the table of FIG. 8. In FIG. 9, four lights ahead of the user are activated, corresponding to a forward threshold (hop count) of four for the distance measure. After the user passes, the sign of the equation, signal-memory is negative, which causes the lights to deactivate. Of course, rather than deactivating, a negative sign within a particular hop count could simply dim the lights out to a selected threshold, beyond which they simply turn off. Using the logic shown in FIG. 8, if the user remains stationary, the state of the lights will remain the same as in the last time step.

If this situation were extended to an area (e.g., a two-dimensional case), a node would likely receive multiple signals from neighbors. In this case, it would select the highest "intensity" signal for use in the node logic. A two-dimensional case is illustrated in FIG. 10, where FIG. 10(*a*), (*b*), and (*c*) illustrate the object's movement across the area from left to right, and the corresponding hop count measure at each node. In FIG. 10(*a*), three nodes in the array detect an object 1000 in the area covered. The number in each node represents the hop count between the detecting node and a node in question. Note that in FIG. 10(*a*), the three nodes that detected the object have "intensities" of 10, and the nodes further away have progressively lower intensities. Since the object was just detected in FIG. 10(*a*), and is new to the network, only those nodes with intensities of 10 are turned on. Subsequently, as the object progresses from left to right across the area, as shown in FIG. 10(*b*), the signal gradient is established and nodes ahead of the object 1000 are lit (nodes experiencing an increase in signal strength turn on and those experiencing a decrease turn off). A cutoff intensity value of 6 is set, with nodes having an intensity of 6 or less remaining unlit. FIG. 10(*c*) shows the object 1000 after it has progressed still further across the area. Again, only nodes that are both in front of the object and that have an intensity over 6 are lit. Nodes behind the object are turned off. As shown, more than one node can detect an object at a given time, especially if the nodes are closely spaced. This same scenario can easily be extended to a three-dimensional case.

In the above scenario, nodes can be activated in a range of up to 90 degrees in azimuth from the direction of motion. That can be desirable in an application such as an overhead lighting array, or even in a sensor network in which it is affordable to wake up nodes that will accurately track deviations in motion. In other applications, it might be desirable to focus the node activation in order to reflect a more accurate prediction of the motion vector from the network itself. To do this, in a situation in which directional communication is available, message-passing rules can be used to make a special annotation in signals forwarded to the single node closest to 180 degrees azimuth from the direction from which the signal was received. Intuitively, the goal is to try to continue passing the signal along the direction of the object's movement vector. Nodes that receive a message with an annotation informing them to activate, as well as an increase in signal intensity, will activate. Signals without the activation annotation will still be passed in all other directions per the propagation techniques presented in co-pending U.S. patent application Ser. No. 09/921,295, but those nodes that do not receive an activation annotation will not activate, even if they do experience an increase in intensity.

In a wired network with a regular connection topology, examples of which include a rectangular or hexagonal grid, each node could be provided with knowledge of the orientation of each connected node with respect to every other connected node. This more focused activation mechanism can also be implemented on a wireless network if the nodes can determine the orientations of local neighbors with respect to themselves. For example, if the nodes communicate to their neighbors via a circular array of infrared transceivers that can be addressed individually, such a data structure could be built by handshaking through each port.

Since, in this situation, nodes only select the highest intensity message to pass on, multiple objects cannot accurately be sensed by the network. Thus, any node will only be aware of movements of the closest object. The propagation techniques presented in co-pending U.S. patent application Ser. No. 09/921,295 allow different message types to represent different objects. But in order to estimate the direction of movement, a persistent object ID must be maintained. It is desirable that the present invention be used with sensors that are not expected to be able to reliably report the difference between two objects of the same type (e.g., a simple infrared sensor that could detect the presence of a warm body, but could not distinguish one human from another). Instead, object tracking is performed using very simple rules based on keeping track of the rise and fall of signal intensities, each tagged by an object ID, as described hereinafter.

The first time an object is sensed on the network, the nodes that sense it will have no signal to compare against. The sensing nodes will activate and will signal at the highest level, incorporating a new object ID into the signal. The ID should be unique across the network, to ensure the ID's uniqueness across the network, a central brokering mechanism should be employed to issue object IDs. If more than one node senses the same object, each node may create a unique ID for the object, which is alright. The message passing rules are used as before, except that the ID is appended to the message. The ID indicates the "type" of the signal message. The logic circuit depicted previously in FIG. 7 can still be used along with the circuit shown in FIG. 6, but the signal 600 and memory 602 blocks must be capable of storing the signals for each object ID presented. The comparator tests each pair of signal 600 and memory 602 blocks, and inputs the results of each into a separate node logic circuit 700. The output of the logic circuit 700 for each object ID would be fed to an OR gate to obtain the next activation value. Other schemes may be applied for supplying specific object IDs, for example, if there are a fixed number of users of the system, such as in the case of a "smart home" application, each user can be provided with an electronic tag or other mechanism by which the nodes can receive an explicit signal that differentiates each user among the group of users. In this case, different functionality can be provided to the activation mechanism so that its reaction is tailored for a particular user. For example, in a "smart home" application, one user may set preferences for lighting levels, what equipment to turn on in particular rooms, and a particular type of air freshener so that when the user wears a particular lapel pin, the pin transmits a user ID to the detecting node that causes the network to react in a manner that fulfills that user's preferences.

What is claimed is:

1. A distributed motion prediction network including a plurality of nodes, the nodes in the network comprising means for:
   detecting the presence of an object in an area around a node, with a node that detects an object termed a detecting node;
   communicating a signal from a detecting node to local nodes that are local with the detecting node to inform the local nodes of the presence of the object in the area around the detecting node; and
   propagating the signal from the local nodes to other nodes that are local to the local nodes such that information regarding the presence of the object is progressively propagated to nodes away from the detecting node and so that as the object moves, the propagated signal is used to predict a direction of travel of the object.

2. A distributed motion prediction network as set forth in claim 1, wherein the signal includes a hop count that is incremented by each node as it is propagated between successive nodes away from the detecting node, the hop count being indicative of a hop count distance from the detecting node and a current node.

3. A distributed motion prediction network as set forth in claim 2, wherein as the object moves along the direction of travel, it is detected by different detecting nodes along the direction of travel, and where signals originating from different detecting nodes are compared at each current node to determine whether the current node is in front of or behind travel of the object.

4. A distributed motion prediction network as set forth in claim 3, wherein the nodes selectively perform an action based on the hop count distance between a current node and a detecting node and the direction of travel of the object.

5. A distributed motion prediction network as set forth in claim 4, wherein the nodes further comprise a means for detecting an object class for an object within the network.

6. A distributed motion prediction network as set forth in claim 5, wherein the action performed by the nodes based on the hop count distance is tailored based on the object class of an object detected.

7. A distributed motion prediction network as set forth in claim 6, wherein the action performed by a node is selected from a group consisting of a visually detectable action, an auditory action, and a scent-based action.

8. A distributed motion prediction network as set forth in claim 7, wherein at least a portion of the nodes are in a fixed position.

9. A distributed motion prediction network as set forth in claim 8, wherein at least a portion of the nodes are hard-wired together.

10. A distributed motion prediction network as set forth in claim 9, wherein the nodes operate according to the logical expression, $\overline{C} \cdot \overline{D} + B \cdot \overline{C} + A \cdot C \cdot \overline{D} + B \cdot C \cdot \overline{D} = Y$, where A represents a current action state, B represents a current sensor state, C represents the result of a determination of whether the signal is equal to a memory state, D represents a signal-memory sign bit, and Y represents a next action state.

11. A distributed motion prediction network as set forth in claim 1, wherein as the object moves along the direction of travel, it is detected by different detecting nodes along the direction of travel, and where signals originating from different detecting nodes are compared at each current node to determine whether the current node is in front of or behind travel of the object.

12. A distributed motion prediction network as set forth in claim 1, wherein the nodes selectively perform an action based on the hop count distance between a current node and a detecting node and the direction of travel of the object.

13. A distributed motion prediction network as set forth in claim 1, wherein the nodes further comprise a means for detecting an object class for an object within the network.

14. A distributed motion prediction network as set forth in claim 13, wherein the action performed by the nodes based on the hop count distance is tailored based on the object class of an object detected.

15. A distributed motion prediction network as set forth in claim 14, wherein the action performed by a node is selected from a group consisting of a visually detectable action, an auditory action, and a scent-based action.

16. A distributed motion prediction network as set forth in claim 1, wherein at least a portion of the nodes are in a fixed position.

17. A distributed motion prediction network as set forth in claim 1, wherein at least a portion of the nodes are hard-wired together.

18. A distributed motion prediction network as set forth in claim 1, wherein the nodes operate according to the logical expression, $\overline{C} \cdot \overline{D} + B \cdot \overline{C} + A \cdot C \cdot \overline{D} + B \cdot \overline{D} = Y$, where A represents a current action state, B represents a current sensor state, C represents the result of a determination of whether the signal is equal to a memory state, D represents a signal-memory sign bit, and Y represents a next action state.

19. A method for providing a distributed motion prediction network including a plurality of nodes, the nodes in the network performing steps of:

detecting the presence of an object in an area around a node, with a node that detects an object termed a detecting node;

communicating a signal from a detecting node to local nodes that are local with the detecting node to inform the local nodes of the presence of the object in the area around the detecting node; and propagating the signal from the local nodes to other nodes that are local to the local nodes such that information regarding the presence of the object is progressively propagated to nodes away from the detecting node and so that as the object moves, the propagated signal is used to predict a direction of travel of the object.

20. A method for providing a distributed motion network as set forth in claim 19, wherein the signal includes a hop count that is incremented by each node during the propagating step as the signal is propagated between successive nodes away from the detecting node, the hop count being indicative of a hop count distance from the detecting node and a current node.

21. A method for providing a distributed motion network as set forth in claim 20, wherein as the object moves along the direction of travel, it is detected by different detecting nodes along the direction of travel, and where signals originating from different detecting nodes are compared at each current node in a comparing step to determine whether the current node is in front of or behind travel of the object.

22. A method for providing a distributed motion network as set forth in claim 21, wherein the nodes selectively perform a step of executing an action based on the hop count distance between a current node and a detecting node and the direction of travel of the object.

23. A method for providing a distributed motion network as set forth in claim 22, wherein the nodes further perform a step of detecting an object class for an object within the network.

24. A method for providing a distributed motion network as set forth in claim 23, wherein the action executed by the nodes based on the hop count distance is tailored based on the object class of an object detected.

25. A method for providing a distributed motion network as set forth in claim 24, wherein the action performed by a node is selected from a group consisting of a visually detectable action, an auditory action, and a scent-based action.

26. A method for providing a distributed motion network as set forth in claim 25, further comprising a step of setting at least a portion of the nodes in a fixed position.

27. A method for providing a distributed motion network as set forth in claim 26, further comprising a step of hard-wiring at least a portion of the nodes together.

28. A method for providing a distributed motion network as set forth in claim 27, wherein the nodes selectively execute the action according to the logical expression, $\overline{C} \cdot \overline{D} + B \cdot \overline{C} + A \cdot C \cdot \overline{D} + B \cdot C \cdot \overline{D} = Y$, where A represents a current action state, B represents a current sensor state, C represents the result of a determination of whether the signal is equal to a memory state, D represents a (signal-memory) sign bit, and Y represents a next action state.

29. A method for providing a distributed motion network as set forth in claim 19, wherein as the object moves along the direction of travel, it is detected by different detecting nodes along the direction of travel, and where signals originating from different detecting nodes are compared at each current node in a comparing step to determine whether the current node is in front of or behind travel of the object.

30. A method for providing a distributed motion network as set forth in claim 19, wherein the nodes selectively perform a step of executing an action based on the hop count distance between a current node and a detecting node and the direction of travel of the object.

31. A method for providing a distributed motion network as set forth in claim 19, wherein the nodes further perform a step of detecting an object class for an object within the network.

32. A method for providing a distributed motion network as set forth in claim 31, wherein the action executed by the nodes based on the hop count distance is tailored based on the object class of an object detected.

33. A method for providing a distributed motion network as set forth in claim 32, wherein the action performed by a node is selected from a group consisting of a visually detectable action, an auditory action, and a scent-based action.

34. A method for providing a distributed motion network as set forth in claim 19, further comprising a step of setting at least a portion of the nodes in a fixed position.

35. A method for providing a distributed motion network as set forth in claim 19, further comprising a step of hard-wiring at least a portion of the nodes together.

36. A method for providing a distributed motion network as set forth in claim 19, wherein the nodes selectively execute the action according to the logical expression, $\overline{C} \cdot \overline{D} + B \cdot \overline{C} + A \cdot C \cdot \overline{D} + B \cdot C \cdot \overline{D} = Y$, where A represents a current action state, B represents a current sensor state, C represents the result of a determination of whether the signal is equal to a memory state, D represents a (signal-memory) sign bit, and Y represents a next action state.

37. A computer program product for providing a computer program product using a plurality of nodes, the computer program product comprising a computer readable medium having embedded therein, means for:

detecting the presence of an object in an area around a node, with a node that detects an object termed a detecting node;

communicating a signal from a detecting node to local nodes that are local with the detecting node to inform the local nodes of the presence of the object in the area around the detecting node; and propagating the signal from the local nodes to other nodes that are local to the local nodes such that information regarding the presence of the object is progressively propagated to nodes away from the detecting node and so that as the object moves, the propagated signal is used to predict a direction of travel of the object.

38. A computer program product as set forth in claim 37, the signal includes a hop count, and wherein the computer program product further comprises means for incrementing the hop count at each node as it is propagated between successive nodes away from the detecting node, the hop count being indicative of a hop count distance from the detecting node and a current node.

39. A computer program product as set forth in claim 38, further comprising means for comparing signals originating from different detecting nodes at each current node as the object moves along the direction of travel to determine whether the current node is in front of or behind travel of the object.

40. A computer program product as set forth in claim 39, further comprising means for causing the nodes to selectively perform an action based on the hop count distance between a current node and a detecting node and the direction of travel of the object.

41. A computer program product as set forth in claim 40, further comprising means for detecting, at each node, an object class for an object within the network.

42. A computer program product as set forth in claim 41, wherein the action performed by the nodes based on the hop count distance is tailored based on the object class of an object detected.

43. A computer program product as set forth in claim 42, wherein the action performed by a node is selected from a group consisting of a visually detectable action, an auditory action, and a scent-based action.

44. A computer program product as set forth in claim 43, further comprising means for operating the nodes according to the logical expression, $\overline{C}\cdot\overline{D}+B\cdot\overline{C}+A\cdot C\cdot\overline{D}+B\cdot C\cdot\overline{D}=Y$, where A represents a current action state, B represents a current sensor state, C represents the result of a determination of whether the signal is equal to a memory state, D represents a signal-memory sign bit, and Y represents a next action state.

45. A computer program product as set forth in claim 37, further comprising means for comparing signals originating from different detecting nodes at each current node as the object moves along the direction of travel to determine whether the current node is in front of or behind travel of the object.

46. A computer program product as set forth in claim 37, further comprising means for causing the nodes to selectively perform an action based on the hop count distance between a current node and a detecting node and the direction of travel of the object.

47. A computer program product as set forth in claim 37, further comprising means for detecting, at each node, an object class for an object within the network.

48. A computer program product as set forth in claim 47, wherein the action performed by the nodes based on the hop count distance is tailored based on the object class of an object detected.

49. A computer program product as set forth in claim 48, wherein the action performed by a node is selected from a group consisting of a visually detectable action, an auditory action, and a scent-based action.

50. A computer program product as set forth in claim 49, further comprising means for operating the nodes according to the logical expression, $\overline{C}\cdot\overline{D}+B\cdot\overline{C}+A\cdot C\cdot\overline{D}+B\cdot C\cdot\overline{D}=Y$, where A represents a current action state, B represents a current sensor state, C represents the result of a determination of whether the signal is equal to a memory state, D represents a signal-memory sign bit, and Y represents a next action state.

51. A node for use in a distributed motion prediction network, the node comprising means for:
   detecting the presence of an object in an area around the node, with the node that detects an object termed a detecting node;
   when the node is a detecting node, communicating a signal from the detecting node to other local nodes that are local with the detecting node to inform the local nodes of the presence of the object in the area around the detecting node; and
   when the node is not a detecting node, but is a node that is local with the detecting node, propagating the signal to other nodes local to the node such that information regarding the presence of the object is progressively propagated to nodes away from a detecting node and so that as the object moves, the propagated signal is used to predict a direction of travel of the object.

52. A node for use in a distributed motion prediction network as set forth in claim 51, wherein the signal includes a hop count that is incremented by the node as it is propagated so that it is incremented between successive nodes away from a detecting node, the hop count, at the node, being indicative of a hop count distance from a detecting node.

53. A node for use in a distributed motion prediction network as set forth in claim 52, wherein as the object moves along the direction of travel, it is detected by different detecting nodes along the direction of travel, and where signals originating from different detecting nodes are compared at the node to determine whether a the node is in front of or behind travel of the object.

54. A node for use in a distributed motion prediction network as set forth in claim 53, wherein the node selectively performs an action based on the hop count distance from a detecting node and the direction of travel of the object.

55. A node for use in a distributed motion prediction network as set forth in claim 54, wherein the node further comprises a means for detecting an object class for an object within the network.

56. A node for use in a distributed motion prediction network as set forth in claim 55, wherein the action performed by the node based on the hop count distance is tailored based on the object class of an object detected.

57. A node for use in a distributed motion prediction network as set forth in claim 56, wherein the action performed by the node is selected from a group consisting of a visually detectable action, an auditory action, and a scent-based action.

58. A node for use in a distributed motion prediction network as set forth in claim 57, wherein the node is configured to reside in a fixed position with respect to other nodes.

59. A node for use in a distributed motion prediction network as set forth in claim 58, wherein the node is configured to be hard-wired with other nodes.

60. A node for use in a distributed motion prediction network as set forth in claim 59, wherein the node operates according to the logical expression, $\overline{C}\cdot\overline{D}+B\cdot\overline{C}+A\cdot C\cdot\overline{D}+B\cdot C\cdot\overline{D}=Y$, where A represents a current action state, B represents a current sensor state, C represents the result of a determination of whether the signal is equal to a memory state, D represents a signal-memory sign bit, and Y represents a next action state.

61. A node for use in a distributed motion prediction network as set forth in claim 51, wherein as the object moves along the direction of travel, it is detected by different detecting nodes along the direction of travel, and where signals originating from different detecting nodes are compared at the node to determine whether the node is in front of or behind travel of the object.

62. A node for use in a distributed motion prediction network as set forth in claim 51, wherein the node selectively performs an action based on the hop count distance from a detecting node and the direction of travel of the object.

63. A node for use in a distributed motion prediction network as set forth in claim 51, wherein the node further comprises a means for detecting an object class for an object within the network.

64. A node for use in a distributed motion prediction network as set forth in claim 63, wherein the action performed by the node based on the hop count distance is tailored based on the object class of an object detected.

65. A node for use in a distributed motion prediction network as set forth in claim 64, wherein the action performed by the node is selected from a group consisting of a visually detectable action, an auditory action, and a scent-based action.

66. A node for use in a distributed motion prediction network as set forth in claim 51, wherein the node is configured to reside in a fixed position with respect to other nodes.

67. A node for use in a distributed motion prediction network as set forth in claim 51, wherein the node is configured to be hard-wired with other nodes.

68. A node for use in a distributed motion prediction network as set forth in claim 51, wherein the node operates according to the logical expression, $\overline{C} \cdot \overline{D} + B \cdot \overline{C} + A \cdot C \cdot \overline{D} + B \cdot C \cdot \overline{D} = Y$, where A represents a current action state, B represents a current sensor state, C represents the result of a determination of whether the signal is equal to a memory state, D represents a signal-memory sign bit, and Y represents a next action state.

69. A method for operating a node for use in a distributed motion prediction network including a plurality of nodes, the node performing steps of:
  detecting the presence of an object in an area around the node, with the node that detects an object termed a detecting node;
  when the node is a detecting node, communicating a signal from the detecting node to local nodes that are local with the detecting node to inform the local nodes of the presence of the object in the area around the detecting node; and
  when the node is not a detecting node, but is a node that is local with the detecting node, propagating the signal to other nodes local to the node such that information regarding the presence of the object is progressively propagated to nodes away from a detecting node and so that as the object moves, the propagated signal is used to predict a direction of travel of the object.

70. A method for operating a node for use in a distributed motion network as set forth in claim 69, wherein the signal includes a hop count that is incremented by the node as it is propagated so that it is incremented between successive nodes away from a detecting node, the hop count, at the node, being indicative of a hop count distance from a detecting node.

71. A method for operating a node for use in a distributed motion network as set forth in claim 70, wherein as the object moves along the direction of travel, it is detected by different detecting nodes along the direction of travel, and where signals originating from different detecting nodes are compared at the node in a comparing step to determine whether the node is in front of or behind travel of the object.

72. A method for operating a node for use in a distributed motion network as set forth in claim 71, wherein the node selectively performs a step of executing an action based on the hop count distance between the node and a detecting node and the direction of travel of the object.

73. A method for operating a node for use in a distributed motion network as set forth in claim 72, wherein the node further performs a step of detecting an object class for an object within the network.

74. A method for operating a node for use in a distributed motion network as set forth in claim 73, wherein the action executed by the node is based on the hop count distance is tailored based on the object class of an object detected.

75. A method for operating a node for use in a distributed motion network as set forth in claim 74, wherein the action performed by the node is selected from a group consisting of a visually detectable action, an auditory action, and a scent-based action.

76. A method for operating a node for use in a distributed motion network as set forth in claim 75, further comprising a step of setting the node in a fixed position.

77. A method for operating a node for use in a distributed motion network as set forth in claim 76, further comprising a step of hard-wiring the node in communicative contact with other nodes.

78. A method for operating a node for use in a distributed motion network as set forth in claim 77, wherein the node selectively executes the action according to the logical expression, $\overline{C} \cdot \overline{D} + B \cdot \overline{C} + A \cdot C \cdot \overline{D} + B \cdot C \cdot \overline{D} = Y$, where A represents a current action state, B represents a current sensor state, C represents the result of a determination of whether the signal is equal to a memory state, D represents a (signal-memory) sign bit, and Y represents a next action state.

79. A method for operating a node for use in a distributed motion network as set forth in claim 69, wherein as the object moves along the direction of travel, it is detected by different detecting nodes along the direction of travel, and where signals originating from different detecting nodes are compared at the node in a comparing step to determine whether the node is in front of or behind travel of the object.

80. A method for operating a node for use in a distributed motion network as set forth in claim 69, wherein the node selectively performs a step of executing an action based on the hop count distance between the node and a detecting node and the direction of travel of the object.

81. A method for operating a node for use in a distributed motion network as set forth in claim 69, wherein the node further performs a step of detecting an object class for an object within the network.

82. A method for operating a node for use in a distributed motion network as set forth in claim 81, wherein the action executed by the node is based on the hop count distance is tailored based on the object class of an object detected.

83. A method for operating a node for use in a distributed motion network as set forth in claim 82, wherein the action performed by the node is selected from a group consisting of a visually detectable action, an auditory action, and a scent-based action.

84. A method for operating a node for use in a distributed motion network as set forth in claim 69, further comprising a step of setting the node in a fixed position.

85. A method for operating a node for use in a distributed motion network as set forth in claim 69, further comprising a step of hard-wiring the node in communicative contact with other nodes.

86. A method for operating a node for use in a distributed motion network as set forth in claim 69, wherein the node selectively executes the action according to the logical expression, $\overline{C} \cdot \overline{D} + B \cdot \overline{C} + A \cdot C \cdot \overline{D} + B \cdot C \cdot \overline{D} = Y$, where A represents a current action state, B represents a current sensor state, C represents the result of a determination of whether the signal is equal to a memory state, D represents a (signal-memory) sign bit, and Y represents a next action state.

87. A computer program product for operating a node for use in a distributed motion network using a plurality of nodes, the computer program product comprising a computer readable medium having embedded therein, means for:
  detecting the presence of an object in an area around the node, with the node that detects an object termed a detecting node;

when the node is a detecting node, communicating a signal from the detecting node to local nodes that are local with the detecting node to inform the local nodes of the presence of the object in the area around the detecting node; and when the node is not a detecting node, but is a node that is local with the detecting node, propagating the signal to other nodes local to the node such that information regarding the presence of the object is progressively propagated to nodes away from a detecting node and so that as the object moves, the propagated signal is used to predict a direction of travel of the object.

88. A computer program product as set forth in claim 87, the signal includes a hop count, and wherein the computer program product further comprises means for providing a hop count in the signal, and for incrementing the hop count by the node as it is propagated so that it is incremented between successive nodes away from a detecting node, the hop count, at the node, being indicative of a hop count distance from a detecting node.

89. A computer program product as set forth in claim 88, further comprising means for comparing signals originating from different detecting nodes at the node as the object moves along the direction of travel to determine whether the node is in front of or behind travel of the object.

90. A computer program product as set forth in claim 89, further comprising means for causing the node to selectively perform an action based on the hop count distance between the node and a detecting node and the direction of travel of the object.

91. A computer program product as set forth in claim 90, further comprising means for detecting, at the node, an object class for an object within the network.

92. A computer program product as set forth in claim 91, wherein the action performed by the node is based on the hop count distance is tailored based on the object class of an object detected.

93. A computer program product as set forth in claim 92, wherein the action performed by the node is selected from a group consisting of a visually detectable action, an auditory action, and a scent-based action.

94. A computer program product as set forth in claim 93, further comprising means for operating the node according to the logical expression, $\overline{C} \cdot \overline{D} + B \cdot \overline{C} + A \cdot C \cdot \overline{D} + B \cdot C \cdot \overline{D} = Y$, where A represents a current action state, B represents a current sensor state, C represents the result of a determination of whether the signal is equal to a memory state, D represents a signal-memory sign bit, and Y represents a next action state.

95. A computer program product as set forth in claim 87, further comprising means for comparing signals originating from different detecting nodes at the node as the object moves along the direction of travel to determine whether the node is in front of or behind travel of the object.

96. A computer program product as set forth in claim 87, further comprising means for causing the node to selectively perform an action based on the hop count distance between the node and a detecting node and the direction of travel of the object.

97. A computer program product as set forth in claim 87, further comprising means for detecting, at the node, an object class for an object within the network.

98. A computer program product as set forth in claim 97, wherein the action performed by the node is based on the hop count distance is tailored based on the object class of an object detected.

99. A computer program product as set forth in claim 98, wherein the action performed by the node is selected from a group consisting of a visually detectable action, an auditory action, and a scent-based action.

100. A computer program product as set forth in claim 87, further comprising means for operating the node according to the logical expression, $\overline{C} \cdot \overline{D} + B \cdot \overline{C} + A \cdot C \cdot \overline{D} + B \cdot C \cdot \overline{D} = Y$, where A represents a current action state, B represents a current sensor state, C represents the result of a determination of whether the signal is equal to a memory state, D represents a signal-memory sign bit, and Y represents a next action state.

* * * * *